(12) United States Patent
Ayano et al.

(10) Patent No.: US 6,377,479 B1
(45) Date of Patent: Apr. 23, 2002

(54) POWER CONVERSION SYSTEM

(75) Inventors: Hideki Ayano; Akira Mishima, both of Hitachi; Satoru Inarida, Hitachinaka, all of (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/660,543

(22) Filed: Sep. 12, 2000

(30) Foreign Application Priority Data

Sep. 14, 1999 (JP) .......................................... 11-259687

(51) Int. Cl.⁷ ................................................ H02M 1/12
(52) U.S. Cl. .............................. 363/40; 363/44; 363/39
(58) Field of Search ............................. 363/39, 40, 46, 363/47, 90, 44

(56) References Cited

U.S. PATENT DOCUMENTS

| | | | | |
|---|---|---|---|---|
| 5,661,390 A | * | 8/1997 | Lipo et al. ...................... | 363/82 |
| 5,831,842 A | * | 11/1998 | Ogasawara et al. ........... | 363/40 |
| 5,852,558 A | * | 12/1998 | Julian et al. ................. | 363/132 |
| 6,122,184 A | * | 9/2000 | Enjeti et al. .................... | 363/47 |
| 6,154,378 A | * | 11/2000 | Peterson et al. ............... | 363/37 |

* cited by examiner

*Primary Examiner*—Shawn Riley
(74) *Attorney, Agent, or Firm*—Antonelli, Terry, Stout & Kraus, LLP (57) ABSTRACT

The output power line 4 of the power converter 2 and the common mode current circulation line 7 are wound together on a magnetic core to form the GP coil 3, each end of the common mode current circulation line 7 is connected to the grounding line 8 of the power supply of the power converter and to the grounding line 6 of the load, and the common mode current is circulated into the power converter 2 via the common mode current circulation line 7. By means of this simple constitution, wherein the impedance in the grounding circuit loop becomes higher than that in the common mode current circulation line loop due to the function of the GP coil and consequently most of the common mode current is led into the circulation loop comprising of the common mode current circulation line, high-frequency noise interference caused by the common mode current is suppressed as a result of the canceling effect of the power line.

10 Claims, 6 Drawing Sheets

POWER CONVERSION SYSTEM

BACKGROUND OF THE INVENTION

The present invention relates to a power conversion system, particularly to the reduction of high-frequency current that is caused as the switching frequency of semiconductor switching devices have become higher.

According to a conventional technique disclosed on a Japanese Laid-Open Patent Publication No. Hei 10-136654 (1998), it is suggested that the common mode current through the grounding circuit is reduced by detecting the common mode current by a zero-phase-sequence current detector and feeding back the common mode current directly to the inverter by means of a current compensating current source using a semiconductor device.

According to a noise control system disclosed on a Japanese Laid-Open Patent Publication No. Hei 5-22985 (1993), it is suggested that the ratio of the common mode current circulating into the inverter to the common mode current flowing out to the grounding circuit is changed, and hence noise is reduced, by directly connecting, with a conductor such as a grounding lead, the grounding terminal of a control unit including the inverter and the grounding terminal of the load such as a motor According to a voltage-type inverter outputting n-phase AC voltage ("n" is a natural number) disclosed on a Japanese Laid-Open Patent Publication No. Hei 11-122953 (1999), it is suggested that the common mode current through the grounding circuit is reduced, and hence noise is reduced, by forming a common mode current circuit for bypassing the grounding circuit wherein the power is supplied through "n" number of coils of a zero-phase transformer having "n+1" number of coils and the neutral point of a capacitor connected to the n-phase AC output terminal is connected to the DC side of the inverter via the remaining coil of the zero-phase transformer.

SUMMARY OF THE INVENTION

The inventors found that with the conventional technique using a common mode choke, however, no effect is expected unless the inductance of the common mode choke is higher enough as compared to the inductance of the power line between the inverter and the load (motor) or the inductance of the grounding portion. As a result, they found a problem that if the power line from the inverter to the load is longer, the common mode choke increases in its capacity and size, and accordingly in its cost.

In case, the conventional technique for detecting the common mode current by a zero-phase-sequence current detector and feeding back the common mode current from the current compensating current source to the inverter, they found that the zero-phase current detector must be faster in speed and higher in accuracy and besides, in order to obtain satisfactory effect of the technique, the semiconductor device used for the current compensating current source must also be larger in capacity.

The inventors also found that with the conventional technique for directly connecting the grounding terminal of the inverter and that of the load with a conductor in order to reduce the common mode current flowing out to the grounding circuit, not a little common mode current flows through the grounding current, and hence radiated noise is caused, unless the impedance of the common mode current feedback line to which the grounding terminal of the inverter and that of the load are connected is lower enough as compared to the impedance of the grounding circuit. In particular, they showed that if the impedance of the grounding circuit is low, very little noise reduction effect is expected.

The inventors found the following facts. With the conventional technique for forming a common mode current circuit wherein the neutral point of a capacitor connected to the n-phase AC output terminal is connected to the DC side of the inverter via one of the coils of the zero-phase transformer, rush current is likely to be caused in the capacitor upon switching the inverter. An inductance must be installed between the inverter and the capacitor to prevent this rush current, resulting in increased size of the system and hence increased cost. Besides, since the capacitor is connected to the inverter and the zero-phase transformer is used to eliminate the zero-phase-sequence voltage, the exciting inductance of the zero-phase transformer must be higher enough as compared to the inductance of the wiring. That is, the system must be larger, involving some cost increase.

An object of the present invention is to suppress, using a simple system, the high-frequency noise interference caused by the common mode current.

The aforementioned problems can be solved by the following means.

According to an aspect of the present invention, when the power is converted by switching a semiconductor switching device, high-frequency current corresponding to the switching frequency is generated and the high-frequency current flows in the loop of the grounding circuit comprising of the power line and the ground with the aid of the floating capacity between the power converter and the ground and between the load and the ground. The high-frequency current, which is called the common mode current because it flows commonly in the power lines corresponding to the number of output phases of the power converter, is apt to cause high-frequency noise interference, including radiated noise and conducted noise, to the peripheral devices.

Another feature of the present invention is a power conversion system with high-frequency noise interference suppressing means, wherein the output power line of a power converter and the common mode current circulation line is wound together on a magnetic core and each end of the common mode current circulation line is connected to the grounding portion of the power supply of the power converter and the grounding portion of the load. The feature is capable of suppressing the high-frequency noise interference caused by the common mode current, employing a simple constitution.

Another feature of the present invention is a power conversion system with high-frequency noise interference suppressing means; wherein the output power line of a power converter and the first common mode current circulation line are wound together on a magnetic core and the input power line and the second common mode current circulation line on another magnetic core, each end of the first common mode current circulation line is connected to the grounding portion of the power converter and the grounding portion of the load, and each end of the second common mode current circulation line is connected to the grounding portion of the power converter and the grounding portion of the power supply of the power converter. The present invention is capable of suppressing the high-frequency noise interference caused by the common mode current, employing another simple constitution. The present invention is not limited to the above description and further explained below referring to drawings.

DETAILED DESCRIPTION OF THE PREFERRED EMBODIMENTS OF THE INVENTION

Higher-speed switching has been realized as a result that a device, such as IGBT, capable of high-speed switching has become popular as a semiconductor switching device constituting a power converter. It is well known that, because of this high-speed switching, high-frequency current flows through a grounding circuit with the aid of the floating capacity between the load of the power converter or the power supply and the ground. This high-frequency current is called common mode current because it runs commonly through each input line and output line of a three-phase or single-phase power converter.

The common mode current increases as the power converter becomes larger in capacity and faster in switching frequency, resulting in a problem that peripheral devices are adversely affected by radiated noise and also by conducted noise due to the electromagnetic induction caused by the common mode current.

Conventionally, in order to suppress the high-frequency noise interference caused by the common mode current, a common mode choke for attenuating the common mode current was installed in the output circuit of a voltage-type inverter. That is, the common mode choke is a magnetic core on which the three-phase output power line of the inverter is wound. This common mode choke is low in impedance for the main current through the U-phase, V-phase and W-phase but functions as high-impedance inductance for the common mode current equivalent to the zero-phase-sequence component, thus suppressing the peak of the common mode current.

Basically, in short, the present invention is to connect the grounding terminal of the power converter or the grounding portion of the power supply directly to the grounding terminal of the load by a common mode current circulation line and form a circulation loop for circulating the common mode current into the converter via the common mode current line. If, in this occasion, the impedance of the circulation loop of the grounding circuit is much lower than the impedance of the circulation loop comprising of the common mode current circulation line, most of the common mode current flows into the grounding circuit loop and a high-frequency noise interference caused by the current remains not-eliminated. The present invention is characteristic of it that the impedance is made higher in the circulation loop of the grounding circuit than that in the circulation loop of the common mode current circulation line by winding the power line and the common mode current circulation line together on a magnetic core. In other words, because the common mode current through the power line and through the common mode current circulation line, both wound on a same magnetic core, are opposite in direction, their magnetic flux cancels each other, resulting in a sufficiently lower impedance of the circulation loop comprising of the power line and the common mode current circulation line. Besides, in the grounding circuit loop comprising of the power line and the grounding circuit, the impedance is higher in the grounding circuit loop because of the self-inductance of the power line wound on the magnetic core, and accordingly the common mode current through the grounding circuit loop can be sufficiently low. Thus, high-frequency noise interference caused by the common mode current through the grounding circuit can be suppressed.

The purpose of winding the power line on a magnetic core as above is neither to limit the peak of the common mode current nor to eliminate the common mode current but to let the common mode current flow through the common mode current circulation line. For this reason, the radiated noise can be suppressed at far less inductance than needed conventionally. Since there flows no main current in the common mode current circulation line but does the common mode current only, a conductor of smaller size than the power line will do for the circulation line.

It is desirous that the aforementioned common mode current circulation line is laid alongside the power line. By doing this, because the common mode current through the power line and that through the common mode current circulation line are opposite in direction, the magnetic flux generated by the common mode current cancels each other and accordingly the noise radiated from the circulation loop comprising of the power line and the common mode current circulation line can be reduced.

Instead of the constitution of the system wherein one end of the common mode current circulation line is connected to the grounding portion of the load, such constitution is also possible that one end of each capacitor is connected to the output power line between the magnetic core and the load of the power converter and the other end is grounded to a point in common and that one end of the common mode current circulation line is connected not to the aforementioned grounding portion of the load but to the grounding portion of the capacitors.

Embodiments of the present invention are explained hereunder, using drawing figures.

First Embodiment

Figure 1:
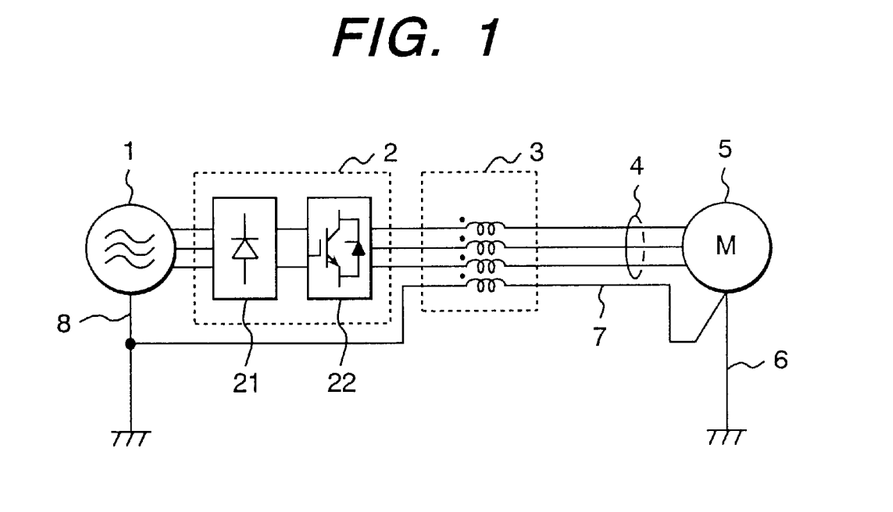
FIG. 1 is a block diagram of the power conversion system in the first embodiment to which the present invention is applied.

FIG. 1 shows the first embodiment of the power conversion system according to the present invention. The AC power supplied by the three-phase power supply 1 is input to the power converter 2. The power converter 2 comprises of the rectifier 21 and the inverter 22. The output from the power converter 2 is supplied to the motor 5 through the three-phase power line 4 equipped with the PG (Power line and Ground line) coil 3. The casing of the motor 5 is grounded by the grounding line 6. One end of the common mode current circulation line, the other end being connected to the grounding portion or grounding system of the motor 5, is connected to the grounding line 8 via the PG coil 3. The grounding line 6 for the motor is installed for preventing an electric shock and, because of this grounding, the potential of the motor is zero and electric shock can be eliminated.

Figure 2:
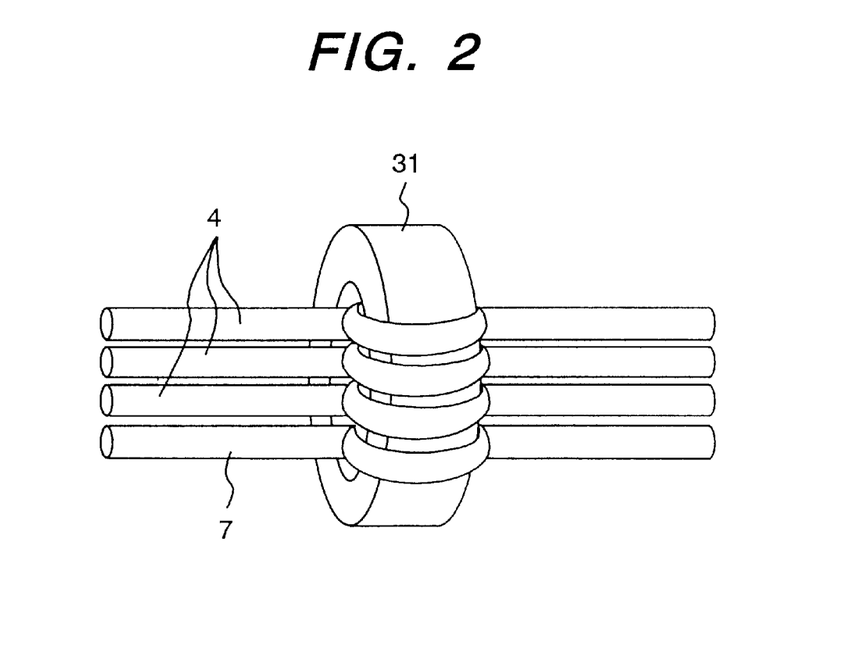
FIG. 2 is a figure of an example of the PG coil relating to a characteristic of the present invention.
Figure 3:
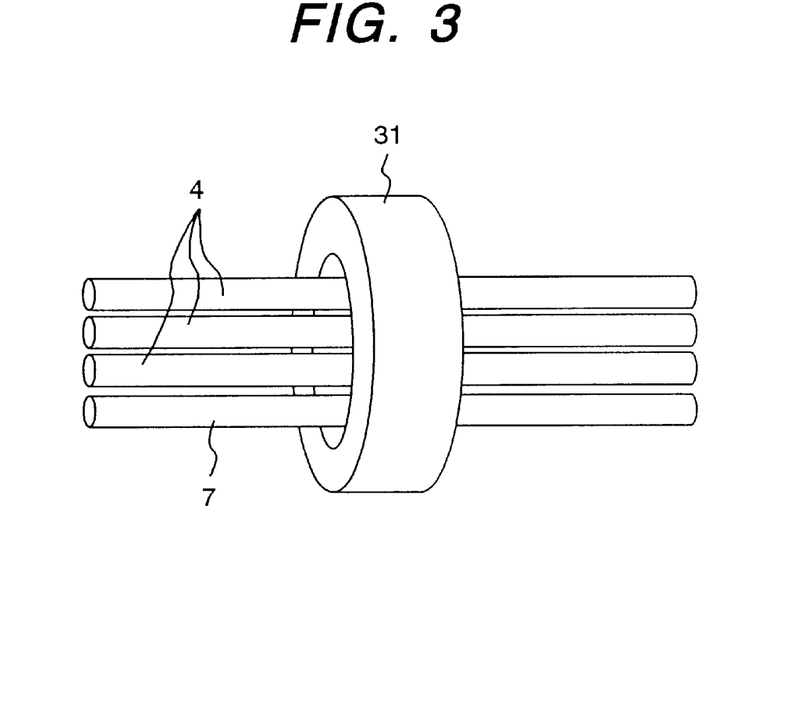
FIG. 3 is figure of another example of the PG coil relating to a characteristic of the present invention.

Explanation about the PG coil 3, which is a characteristic of the present invention, is given below by referring to an enlarged view in FIG. 2. As shown in the figure, the PG coil 3 comprises of a ring-shaped magnetic core 31 on which the power line 4 and the common mode current circulation line 7 are wound together. FIG. 2 is an example wherein the two lines are wound on the magnetic core 31 in the same direction by the same number of turns (one turn in the figure). In case the current through the motor 5 is higher, the power line 4 must be larger in diameter and accordingly becomes impossible to be wound on the magnetic core 31 as shown in FIG. 2. In such a case, another constitution as shown in FIG. 3 is also allowable, wherein the power line 4 and the common mode current circulation line 7 are passed through the magnetic core 31. That is to say, an example in FIG. 3 is very much effective for a system through which high current flows.

Figure 4:
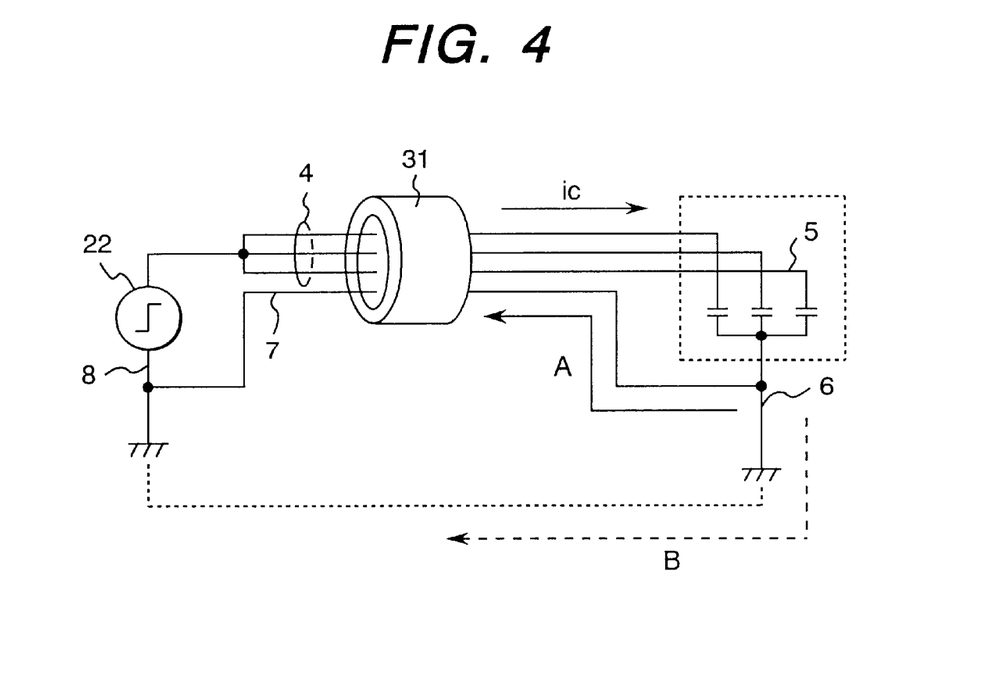
FIG. 4 is a Conceptual equivalent circuit diagram, prepared for the purpose of explaining the operation.

Function of the embodiment constituted as shown in FIG. 1 is explained below. FIG. 4 shows a conceptual equivalent circuit with regard to the common mode current of the embodiment in FIG. 1. The common mode current B flowing in the grounding line 6 of the motor circulates into the power converter 2 through the grounding line 6, via the ground, and then through the power supply 1, as shown by a broken line in the figure, and electromagnetic wave caused by this current adversely affects upon the peripheral devices. In other words, the common mode current "ic" generated by switching the semiconductor switching device of the inverter 22 flows from the power line 4 into the grounding line 6 with the aid of the floating capacity of the motor 5, and circulates into the inverter 22 via the ground. According to the embodiment of the present invention, however, as a result that the common mode current circulation line 7 is installed to directly connect the grounding portion of the motor 5 and the grounding portion of the inverter 21 and also that the PG coil 3 comprising of the magnetic core 31 on which the power line 4 and the common mode current circulation line 7 are wound together is installed, the possible circulation route of the common mode current "ic" is either route A through the common mode current circulation line or route B through the grounding circuit of the ground.

The common mode current component through the route B has high impedance because the current flows through the PG coil 3 in one direction and accordingly the PG coil 3 functions as an inductance. On the contrary, the common code current component through the route A has low impedance because the current flows through the PG coil 3 in an opposite direction to the common mode current "ic" through the power line 4 and accordingly the magnetic flux is cancelled each other in the PG coil 3 and the PG coil 3 does not function as an inductance. As a result, the common mode current flows through the route A which has lower impedance. Besides, when the power line 4 and the common mode current circulation line 7 are laid closely, the magnetic field around the power line 4 caused by the common mode current is cancelled by the magnetic field of the common mode current circulation line 7 and accordingly the radiated noise from the power line 4 is suppressed.

The PG coil 3 with a smaller number of cores than for the conventional common mode choke can reduce the common mode current into the grounding circuit. A similar effect can be achieved even in a case that the grounding line 6 is not employed but the motor 5 is grounded directly to the ground. Besides, since the current through the common mode current circulation line 7 is much lower than the main current, the conductor of a smaller size will do for the line.

Figure 5:
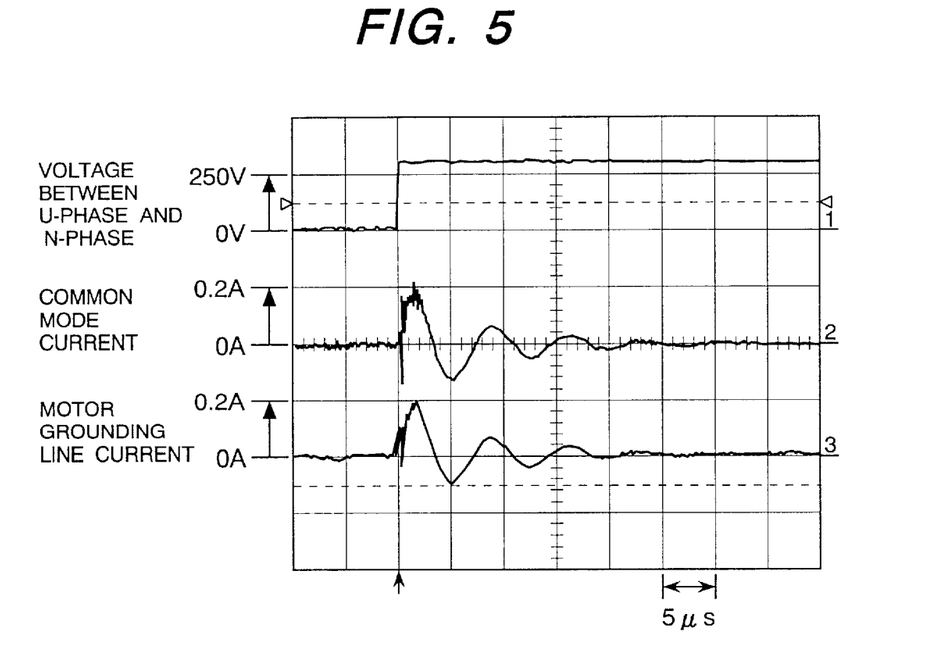
FIG. 5 is a chart of the measured common mode current through the motor grounding line according to a conventional embodiment, prepared for the purpose of explaining the effect of the present invention.
Figure 6:
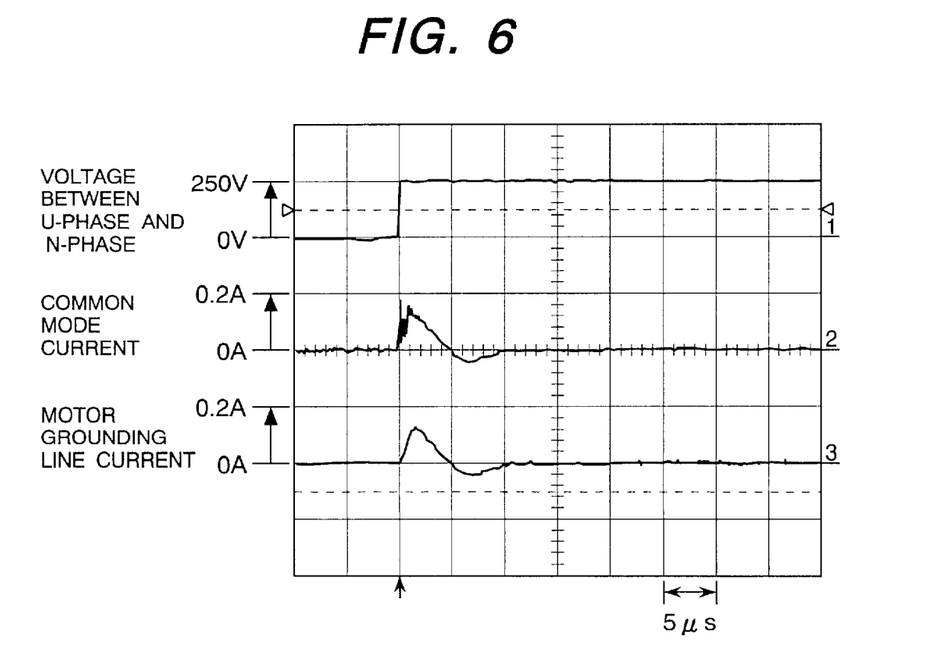
FIG. 6 is a chart of the measured common mode current through the motor grounding line according to another conventional embodiment, prepared for the purpose of explaining the effect of the present invention.
Figure 7:
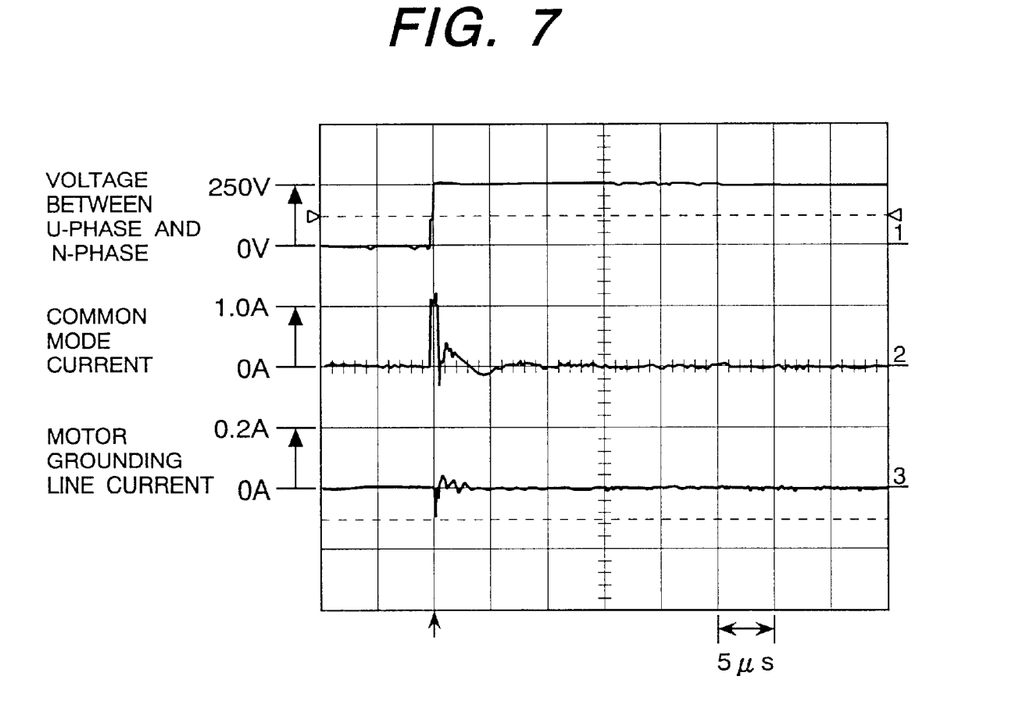
FIG. 7 is a chart of the measured common mode current through the motor grounding line in the embodiment in FIG. 1.

The effect of the embodiment shown in FIG. 1 in reducing the common mode current and the current in the grounding circuit loop is explained below in comparison with conventional cases. FIG. 5 is a conventional case wherein no particular measures are provided to reduce the common mode current; FIG. 6 is a conventional case wherein a common mode choke is installed in the power line to reduce the common mode current; and FIG. 7 is the embodiment of the present invention. The inductance of the common mode choke employed herein is the same as that of the PG coil 3 of the present invention. The measurement results shown in the figures are the common mode current and the motor grounding line current measured upon switching of the U-phase. The common mode current was measured on the three-phase power line 4 in a bundle.

In a case with no particular reduction measures, as indicated in FIG. 5, the common mode current with the peak of 0.2 A, root-mean-square value of 38 mA, and oscillating frequency of 170 kHz flows into the ground through the grounding line 6 of the motor.

In a conventional case employing a common mode choke shown in FIG. 6, the peak of the motor grounding line current is 0.14 A and the root-mean-square value is 25 mA. It is understood that both peak and root-mean-square value are reduced as compared to the case in FIG. 5.

In the present invention shown in FIG. 7, the peak of the common mode current increases to 1.9 A because the impedance is lower. Because most of the common mode current flows through the common mode current circulation line 7, however, the peak of the motor grounding line current is halved to 0.1 A. Besides, the peak is reduced by about 30% as compared to the case employing a common mode choke of the same capacity. In addition, as compared a to the case with no particular measures, the root-mean-square value can be reduced by more than 90%. Based on this result, the PG coil 3 is regarded very much effective for reducing the noise caused by the common mode current.

Second Embodiment

Figure 8:
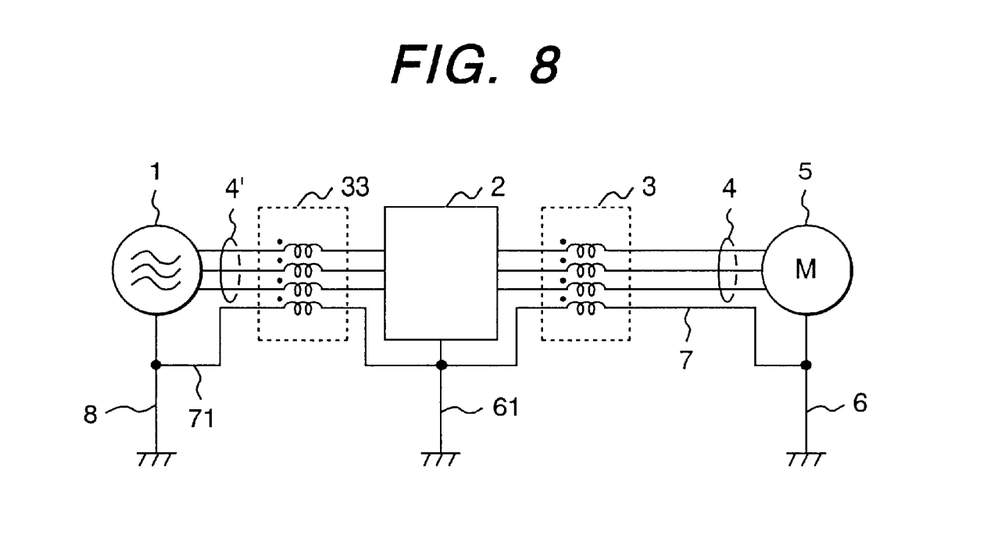
FIG. 8 is a block diagram of the power conversion system in the second embodiment to which the present invention is applied.

FIG. 8 shows the second embodiment of the present invention. This embodiment is different from the one in FIG. 1 in that the casing of the power converter 2 is grounded. In the example shown, the casing of the power converter 2 is grounded by the grounding line 61, the common mode current circulation line 71 is laid alongside the power line 4' between the AC power supply 1 and the power converter 2, and the PG coil 33 on which the power line 4' and the common mode current circulation line 71 are wound together is provided. In short, since the grounding circuit loop of the common mode current is separated to the input side and output side of the power converter 2, two common mode current circulation lines are provided for the two sides. With this constitution, because the common mode current flows through the common mode current circulation line 7 and the common mode current circulation line 71, and can hardly flow into the grounding circuit loop, the radiated noise can be suppressed similarly as in the embodiment in FIG. 1. Since the potential of the casing of the power converter 2 becomes zero thanks to the grounding line 61, this constitution contributes to prevent electric shock. The structure of the PG coils 3 and 33 applied to this embodiment can be the same as shown in FIGS. 2 and 3.

Third Embodiment

Figure 9:
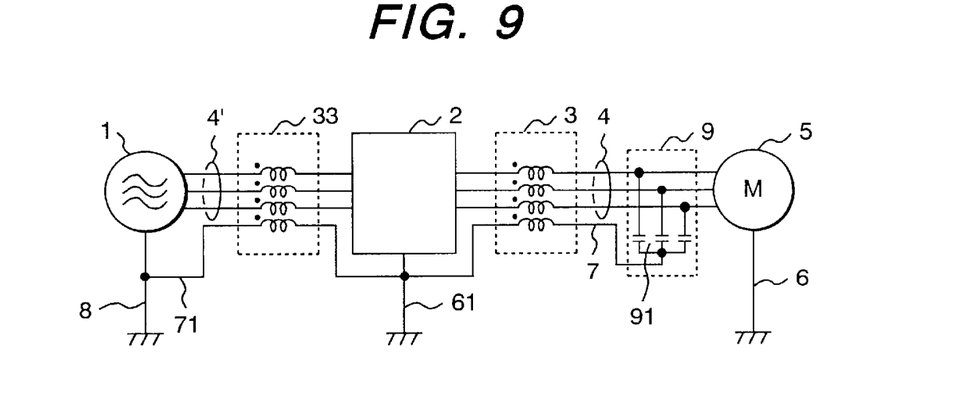
FIG. 9 is a block diagram of the power conversion system in the third embodiment to which the present invention is applied.

FIG. 9 shows the third embodiment of the present invention. This embodiment is different from the one in FIG. 8 in it that one end of each capacitor 91 is connected to the input power line 4 of the motor 5 and the other end to a point in common, which in turn forms the common mode current outlet 9, and that one end of the common mode current circulation line 7 is connected not to the grounding portion of the motor 5 but to the common point of the common mode current outlet 9. With this constitution, the common mode current in the power line 4 flows into the common mode current circulation line 7 via the common mode current outlet 9, and circulates into the power converter 2 via the PG coil 32. Even with this constitution, most of the common mode current flows into the common mode current circulation line 7 via the common mode current outlet 9. Consequently, the common mode current through the motor can be reduced drastically, and hence deterioration of the motor insulation due to the common mode current can be controlled.

Fourth Embodiment

Figure 10:
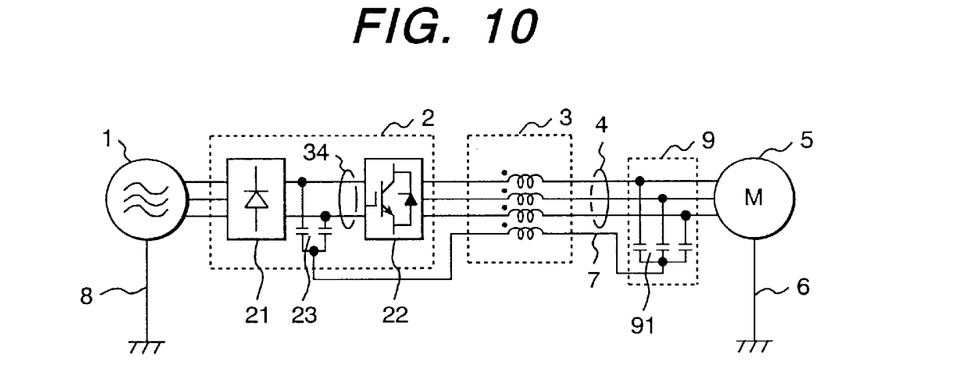
FIG. 10 is a block diagram of the power conversion system in the fourth embodiment to which the present invention is applied.

FIG. 10 shows the fourth embodiment of the present invention. This embodiment is a modification to the embodiment shown in FIG. 1, wherein the dividing capacitors 23 for dividing the DC input voltage of the inverter 22 are installed and one end of the common mode current circulation line 7 is connected not to the grounding portion of the AC power supply 1 but to the dividing point of the dividing capacitors 23. Even with this constitution, the same effect as in the third embodiment can be achieved.

Fifth Embodiment

Figure 11:
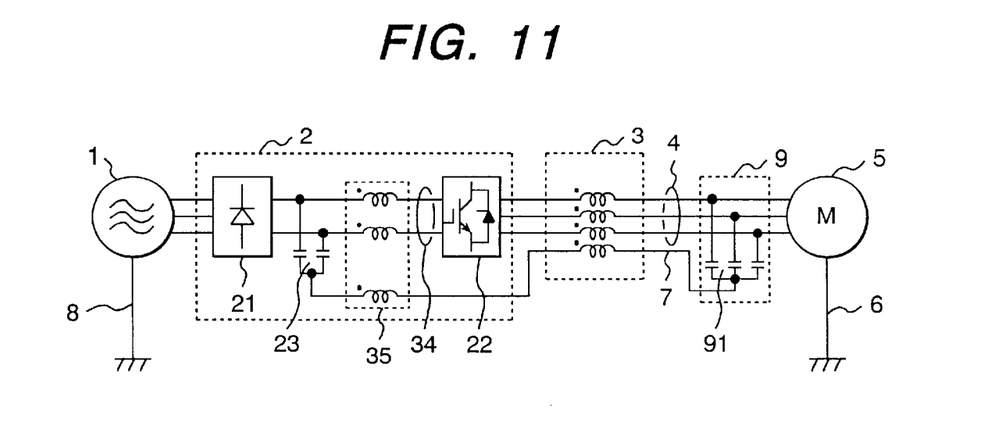
FIG. 11 is a block diagram of the power conversion system in the fifth embodiment to which the present invention is applied.

FIG. 11 shows the fifth embodiment of the present invention. This embodiment is characteristic of it that the PG coil 35 on which the power line 34 and the common mode current circulation line 7 are wound together is installed on the DC portion between the dividing capacitors 23 and the inverter 22 shown in FIG. 10. With this constitution, it becomes possible to suppress not only the common mode current flowing through the grounding circuit loop with the aid of the floating capacity of the motor 5 but the common mode current flowing through the grounding circuit loop with the aid of the floating capacity between the inverter 22 and the housing of the power converter 2.

Besides, the same effect can be achieved even by eliminating the dividing capacitors 23 if one end of the common mode current circulating line 7, currently connected to the dividing point, is connected to either positive or negative electrode of the DC side of the inverter.

Sixth Embodiment

Figure 12:
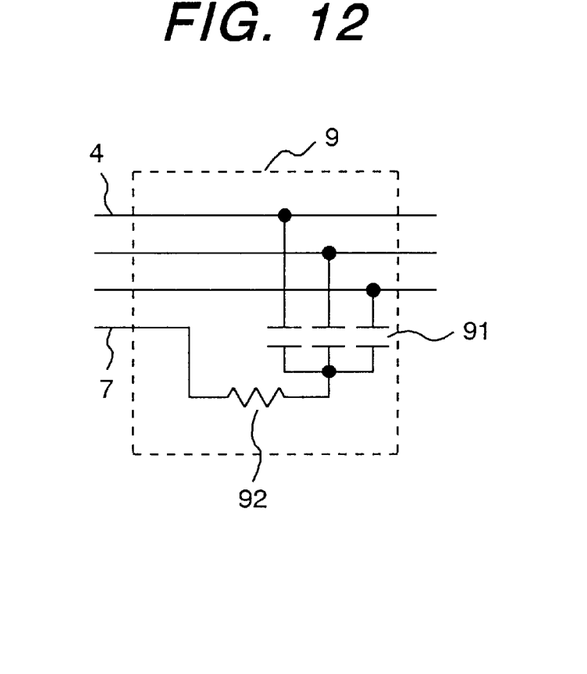
FIG. 12 is a diagram showing a different embodiment of the star-connected capacitors relating to a characteristic of the present invention.
Figure 13:
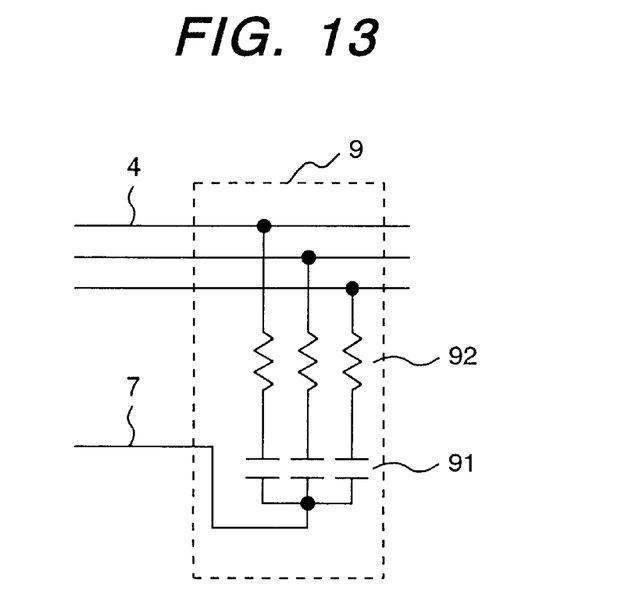
FIG. 13 is diagram showing another different embodiment of the star-connected capacitors relating to a characteristic of the present invention.

FIG. 12 and FIG. 13 shows each modification to the common mode current outlet 9. The embodiment in FIG. 9 is characteristic of it that the common mode current circulation line 7 is connected to the common connection point of the common mode current inlet 9 via the resistor 92. With this constitution, such resonance that may possibly be caused between the PG coil 3 or other device and the common mode current outlet 9 can be suppressed.

The embodiment in FIG. 13 is characteristic of it that each resistor 92 is connected in series to each capacitor 91 of the common mode current outlet 9. With this constitution, the same effect as in FIG. 12 can be achieved and possible resonance between the cables can also be suppressed.

Although the explanation in each of the aforementioned, embodiments covers application of the present invention to a three-phase power converter, the same effect can be achieved even when the present invention is applied to a single-phase inverter or other similar power converter. Although the power converter 2 in the embodiments comprises of a combination of the rectifier 21 and the inverter 22, the application is not limited to those embodiments but the present invention can be applied also to a power rectifier that employs a switching control instead of the rectifier 21. The power supply 1 in the embodiments is of a grounded type but the present invention is applicable also to a non-grounded type. As explained above, it is needless to say that the present invention is not limited to the aforementioned embodiments but can be applied to a modified embodiment so far as the intention of the present invention is not altered.

What is claimed is:

1. A power conversion system with high-frequency noise interference suppressing means comprising:

an output power line of a power converter and a common mode current circulation line being wound together on a same magnetic core; and one end of the common mode current circulation line being connected to a grounding portion of a power supply of the power converter and another end to a grounding portion of a load, magnetic flux from current flowing through the output power line and magnetic flux from current flowing through the common mode current circulation line canceling each other.

2. A power conversion system with high-frequency noise interference suppressing means comprising:

an output power line of a power converter and a first common mode current circulation line being wound together on a same magnetic core;

an input power line of the power converter and a second common mode current circulation line being wound together on another same magnetic core;

one end of the first common mode current circulation line being connected to a grounding portion of the power converter and the other end to a grounding portion of the load; and one end of the second common mode current circulation line being connected to the grounding portion of the power converter and another end to a grounding portion of a power supply of the power converter, magnetic flux from current flowing through the power line and magnetic flux from current flowing through the first common mode current circulation line canceling each other and magnetic flux from current flowing through the power line and magnetic flux from current flowing through the second common mode current circulation line canceling each other.

3. A power conversion system according to claim 1 or claim 2; wherein the common mode current circulating line is laid alongside the power line.

4. A power conversion system with high-frequency noise interference suppressing means comprising:
- an output power line of a power converter and a common mode current circulation line being wound together on a same magnetic core;
- one end of each capacitor being connected to the output power line between the magnetic core and the power converter and another end to a point in common, which in turn forms a common mode current outlet; and
- one end of the common mode current circulation line being connected to a grounding portion on a power supply of the power converter and the other end to a common connection point of the common mode current outlet, magnetic flux from current flowing through the output power line and magnetic flux from current flowing through the common mode current circulation line canceling each other.

5. A power conversion system with high-frequency noise interference suppressing means comprising:
- an output power line of an inverter and a common mode current circulation line being wound together on a same magnetic core;
- one end of each first-group capacitor being connected to the output power line between the magnetic core and a load of the inverter and another end to a point in common, which in turn forms a common mode current outlet;
- a pair of second-group capacitors for dividing DC voltage being connected to an input power line of the inverter; and one end of the common mode current circulation line being connected to a common connection point of the common mode current outlet and another end to a dividing point of the second-group capacitors, magnetic flux from current flowing through the output power line and magnetic flux from current flowing through the common mode current circulation line canceling each other.

6. A power conversion system with high-frequency noise interference suppressing means comprising:
- an output power line of an inverter and a common mode current circulation line being wound together on a same magnetic core;
- one end of each capacitor being connected to the output power line between the magnetic core and a load of the inverter and another end to a point in common, which in turn forms a common mode current outlet; and one end of the common mode current circulation line being connected to a common connection point of the common mode current outlet and another end to either the positive or negative electrode of a DC input of the inverter, magnetic flux from current flowing through the output power line and magnetic flux from the current flowing through the common mode current circulation line canceling each other.

7. A power conversion system with high-frequency noise interference suppressing means comprising:
- an output power line of an inverter and a common mode current circulation line being wound together on a first same magnetic core;
- an input power line of the inverter and the common mode current circulation line being wound together on a second same magnetic core;
- one end of each first-group capacitor being connected to the output power line between the first magnetic core and a load of the inverter and another end to a point in common, which in turn forms a common mode current outlet;
- a pair of second-group capacitors for dividing DC voltage being connected to the input power line on an input power side before the second magnetic core; and
- one end of the common mode current circulation line being connected to a common connection point of the common mode current outlet and another end to a dividing point of the second-group capacitors, magnetic flux from current flowing through the output power line and magnetic flux from current flowing through the second common mode current circulation line canceling each other, and magnetic flux from current flowing through the output power line and magnetic flux from current flowing through the second common mode current circulation line canceling each other.

8. A power conversion system with high-frequency noise interference suppressing means comprising:
- an output power line of an inverter and a common mode current circulation line being wound together on a first same magnetic core;
- an input power line of the inverter and the common mode current circulation line being wound together on a second same magnetic core;
- one end of each capacitor being connected to the output power line between the first magnetic core and a load of the inverter and another end to a point in common, which in turn forms a common mode current outlet; and
- one end of the common mode current circulation line being connected to a common connection point of the common mode current outlet and another end to either the positive or negative electrode of a DC input of the inverter, magnetic flux from the current flowing through the output power line and magnetic flux from the current flowing through the first common mode current circulation line canceling each other, and magnetic flux from current flowing through the output power line and magnetic flux from current flowing through the second common mode current circulation line canceling each other.

9. A power conversion system according to any one of claims 4 to 8; further comprising a resistor installed between the common mode current outlet and the common mode current circulating line.

10. A power conversion system according to any one of claims 4 to 8; further comprising a resistor installed between each capacitor of the common mode current outlet and the power outlet line.

* * * * *